United States Patent [19]
Draper et al.

[11] Patent Number: 6,080,254
[45] Date of Patent: Jun. 27, 2000

[54] METHOD OF PROTECTING METALS AGAINST CORROSION

[76] Inventors: Russell James Draper, 5211 Globert, Montreal, Quebec, Canada, H3W 2E6; Patrick Albert Draper, 2 Bellview Park, 27 Valley Drive, Hillcrest, 3610, South Africa

[21] Appl. No.: 08/905,466

[22] Filed: Aug. 4, 1997

[51] Int. Cl.[7] ............................................. E04B 2/00
[52] U.S. Cl. .................... 156/71; 156/182; 156/187; 156/450; 52/741.3; 138/DIG. 6; 166/242.2; 405/211.1
[58] Field of Search ................ 156/71, 182, 187, 156/450; 138/DIG. 6; 52/741.3, 746.1; 166/242.2; 405/211.1

[56] References Cited

U.S. PATENT DOCUMENTS

| | | | |
|---|---|---|---|
| Re. 30,771 | 10/1981 | Zondek ........................ | 156/196 |
| 3,600,268 | 8/1971 | Hori et al. .................... | 161/167 |
| 4,082,588 | 4/1978 | Anderton et al. ............ | 156/71 |
| 4,125,665 | 11/1978 | Bemmels et al. . | |
| 4,506,485 | 3/1985 | Apostolos .................... | 52/515 |
| 4,772,344 | 9/1988 | Andoe .......................... | 156/64 |
| 4,907,386 | 3/1990 | Ekroth ......................... | 52/169.14 |
| 5,814,172 | 9/1998 | Cox et al. .................... | 156/71 |
| 5,828,460 | 10/1998 | Lucovsky et al. ........... | 356/466 |

FOREIGN PATENT DOCUMENTS 52-38581  3/1977  Japan ................................. 156/187

*Primary Examiner*—Jeff H. Aftergut
*Attorney, Agent, or Firm*—Swabey Ogilvy Renault

[57] ABSTRACT

A metal surface is protected against corrosion, by adhesively bonding a flexible, vapor impermeable metal-plastic laminate to the metal surface, the laminate comprising a metal foil and a plastic film having one surface bonded to one surface of the metal foil. The metal foil is remote from the metal surface with the plastic film being disposed therebetween, and acts as a vapor barrier preventing corrosive vapor, water vapor or oxygen from reaching the metal surface. Such a laminate can also be used for preventing corrosion of metal reinforcing bars in reinforced concrete structures.

19 Claims, 2 Drawing Sheets

METHOD OF PROTECTING METALS AGAINST CORROSION

BACKGROUND OF THE INVENTION

The present invention pertains to improvements in the field of corrosion protection. More particularly, the invention relates to a method of protecting metal surfaces and metal articles against corrosion, as well as to a method of preventing the corrosion of metal reinforcing bars in reinforced concrete structures.

In the corrosion prevention of steel and other metals susceptible to corrosion, the metal is separated from the corrosive environment by a variety of barriers. Such barriers reduce the rate of transport of corrosive substances to the metal surface. These barriers are applied as wrappings or coatings to the metal surface.

For example, metallic coatings are applied to steel by dipping the steel into the molten metal, spraying the molten metal onto the steel surface or electroplating the metal onto the steel. Usually the metallic layer thus formed is of sufficient thickness to be impermeable to oxygen and water vapor. This layer excludes corrosive substances and prevents the corrosion of the underlying steel surface. Examples of metals which may be used for coating steel include zinc, aluminum and chromium. Such conventional metallic coatings have the disadvantage of inadequate adhesion to rusted or contaminated steel surfaces and are therefore precluded for corrosion protection in situations where adequate surface cleaning is not possible.

In the corrosion protection of steel where abrasive blast cleaning is not possible, petrolatum tapes are used for corrosion protection. Fabric is saturated with petrolatum materials, manufactured into flat sheets and rolled into tape form. These petrolatum based tapes are applied to the steel surface, usually being wrapped around steel pipes and tubes. Due to the thickness and impermeability of the petrolatum tape, the transport of corrosive substances including moisture and oxygen to the steel substrate is substantially retarded so that the rate of corrosion is substantially reduced. These petrolatum tapes have the disadvantages of low adhesion to the substrate. The tapes do not adhere sufficiently to support there own weight and must therefore be applied by circumferential wrapping around tubular objects. These tapes are soft and weak, being susceptible to damage by peeling, impact and abrasion. Another disadvantage of these tapes is the excessive thickness required and lumpy uneven appearance and color. These tapes are therefore precluded for corrosion protection in situations where circumferential wrapping is not possible, in situations where a paint-like appearance is desired and in situations where mechanical impact and abrasion occur.

In the corrosion protection of steel, coatings consisting of pigmented organic or inorganic resins are also applied as fluids to steel surfaces. After application, the resins solidify to form continuous semipermeable membranes adhered to the steel substrate. These resins are substantially impermeable to dissolved salts such as chloride ions, and are permeable to oxygen and water vapor. Pigments consisting of flake shaped particles are incorporated into these coatings. These pigments being themselves impermeable to oxygen and water vapor, reduce the vapor permeability of the coatings. Examples of such pigments include glass, aluminum or mica flakes. Although these flake pigments reduce the rate of oxygen and water vapor diffusion through the coatings, they do not render the coatings completely impermeable to vapor diffusion. The pigmented resinous coatings provide effective corrosion protection to steel surfaces which have been thoroughly cleaned of mill scale, rust, soluble salts and other contaminants. It is universally accepted that thorough surface preparation is critical to the long term successful performance of these coatings. The durability or service life of the coatings is proportional to the degree of cleanliness of the steel surface. Increasing the degree of surface cleanliness increases the coating service life. In corrosion theory, it is believed that contaminants under the coating at the metal surface catalyze the electrochemical corrosion reactions.

Organic coatings based on aluminum pigmented epoxy resins and specially formulated for application to rusted and contaminated steel surfaces have been developed. These are known in the trade as "surface tolerant coatings". It is well known that these surface tolerant coatings, while less sensitive to the standard of surface preparation, do not provide satisfactory durability in highly corrosive environments. These coatings fail within an unacceptably short period, usually within two years, if applied to rusted or contaminated steel and exposed to severely corrosive environments. The mode of failure of these coatings is blistering followed by detachment caused by the ongoing process of metal corrosion beneath the coating.

Standards for surface cleanliness of steel have been adopted by organizations involved in the corrosion protection of steel. One such standard is ISO 8501-1 issued by the International Organization for Standards. This standard defines the following degrees of cleanliness for steel listed in order of increasing degree of cleanliness:

St 2: hand or power tool cleaning where tightly adhering rust and mill scale remains on the steel.

St 3: thorough hand or power tool cleaning to bright metal appearance.

Sa 1: light blast cleaning known as Brush-off blasting.

Sa 2: thorough blast cleaning known as Commercial blast cleaning.

Sa 2½: very thorough blast cleaning. Known as a Near-White metal appearance.

Sa 3: blast cleaning to visually clean steel.

Known as a White metal finish.

A coating applied to a surface cleaned to standard ISO 8501-1 Sa 3 (white metal) will have a significantly longer service life in comparison to the same coating applied to a surface prepared to the lower standard St 2 (adherent rust remains). Surface preparation usually represents more than half the total cost of a steel coating project. Increasing the standard of surface preparation increases the cost of surface preparation. Prior art coatings have the disadvantage of being sensitive to the standard of surface preparation.

In certain circumstances, particularly in maintenance of steel structures, surface preparation by abrasive blast cleaning is impossible or not cost effective due to problems such as noise, dust and the proximity of sensitive equipment. Blast cleaning of structures previously coated with lead-based paints presents legal and health risks associated with the containment and the disposal of the lead-containing paint flakes within the dust and blast residue. Thus, corrosion protection is extremely costly due to the costliness of abrasive blast cleaning to high standards. Corrosion protection over the long term is often impossible in situations where blast cleaning is not possible.

SUMMARY OF THE INVENTION

It is therefore an object of the present invention to overcome the above drawbacks and to provide a method of protecting metals against corrosion, which does not require abrasive blast cleaning, is substantially insensitive to the degree of surface preparation and yet provides long term durability in severely corrosive environments.

According to one aspect of the invention, there is provided a method of protecting a metal surface against corrosion, which comprises adhesively bonding a flexible, vapor impermeable metal-plastic laminate to the metal surface, the laminate comprising a metal foil and a plastic film having one surface bonded to one surface of the metal foil. The metal foil is remote from the metal surface with the plastic film being disposed therebetween, and acts as a vapor barrier preventing corrosive vapor, water vapor or oxygen from reaching the metal surface. The plastic film, on the other hand, electrically insulates the metal foil from the metal surface.

Applicant has found quite unexpectedly that by interposing a plastic film between the metal surface to be protected and a metal foil, not only does the metal foil of the laminate act as a vapor barrier preventing corrosive vapor, water or oxygen from reaching the metal surface, but also the plastic film of such a laminate electrically insulates both metals from each other and thereby prevents bimetallic corrosion. It is therefore essential in accordance with the present invention to dispose the plastic film between the metal surface and the metal foil when bonding the laminate to the metal surface.

Preferably, a layer of adhesive material is disposed between the metal foil and the plastic film and securely bonds the metal foil and plastic film together. Where the plastic film used is a nylon film and the metal foil is an aluminum or copper foil, the adhesive material advantageously comprises an acrylic adhesive. Nylon has been found to impart sufficient tensile strength to the laminate so that it can be tensioned by hand during application without tearing. Additionally, nylon imparts advantageous elastic properties to the laminate. Unlike the metal foil alone, the laminate will spring back to its original smooth flat form if accidentally deformed during application.

According to a preferred embodiment, the laminate includes a layer of pressure-sensitive adhesive material on the opposite surface of the plastic film for bonding the laminate to the metal surface, the layer of pressure-sensitive adhesive material being covered with a peel-off removable backing member. Thus, prior to applying the laminate onto the metal surface the backing member is peeled off to expose the pressure-sensitive adhesive material for adhesion to the metal surface. Preferably, the pressure-sensitive adhesive material comprises an acrylic adhesive and the backing member comprises a silicone coated polyethylene sheet.

Prior to applying the laminate onto the metal surface, the metal surface is preferably cleaned to standard ISO 8501-1 St 2 (or SS PC SP2/SP3), the cleaned metal surface is coated with a resinous primer fluid and the coating of resinous primer fluid is allowed to solidify to at least a touch dry condition. Preferably, the resinous primer fluid is an acrylic, alkyd or epoxy metal primer. For example, use can be made of the epoxy primer fluid sold under the trademark SIGMACOVER ALUPRIMER by Sigma Coatings.

After application of the laminate onto the metal surface, the metal foil is advantageously coated with a resinous fluid and the coating of resinous fluid is allowed to solidify. Preferably, the resinous fluid is a polyurethane, polyurethane-acrylic or acrylic fluid. For example, use can be made of the polyurethane-acrylic fluid sold under the trademark SIGMADUR GLOSS by Sigma Coatings.

Alternatively, the laminate can include an additional plastic film having one surface bonded to the opposite surface of the metal foil in order to protect the metal foil against abrasion and impact.

In the case where a crevice is formed in the metal surface, the laminate covers and seals such a crevice. Preferably, the crevice is filled with a solid filler material prior to applying the laminate onto the metal surface.

According to another aspect of the invention, there is provided a method of preventing corrosion of metal reinforcing bars in reinforced concrete, which comprises adhesively bonding a flexible, vapor impermeable metal-plastic laminate as defined above, to the surface of the concrete, the metal foil of the laminate being remote from the concrete surface with the plastic film disposed therebetween, and acting as a vapor barrier preventing corrosive vapor, water vapor or oxygen from reaching the metal bars.

Prior to applying the laminate onto the concrete surface, the surface is preferably coated with a resinous primer fluid to seal and level the concrete surface. The resinous primer fluid used can be an epoxy fluid such as the fluid sold under the trademark SIGMAGUARD CSF 75 by Sigma Coatings.

According to a further aspect of the invention, there is provided a method of protecting metal articles against corrosion, which comprises the steps of:

a) providing a container having an opening and closure means for closing said opening and forming an air-tight seal, the container being made of a flexible, vapor impermeable metal-plastic laminate comprising an outer metal foil and an inner plastic film having one surface bonded to one surface of the metal foil;

b) inserting the metal article into the container through the opening thereof; and c) closing the opening with the closure means;

whereby the metal foil acts as a vapor barrier preventing corrosive vapor, water vapor or oxygen from reaching the metal article.

According to yet another aspect of the invention, there is provided a method of protecting metal articles against corrosion, which comprises the steps of:

a) providing a container having an opening and closure means for closing the opening and forming an air-tight seal, the container being made of a flexible, vapor impermeable metal-plastic laminate comprising a metal foil, an inner plastic film having one surface bonded to one surface of the metal foil and an outer plastic film bonded to the opposite surface of said metal foil;

b) inserting the metal article into the container through the opening thereof; and c) closing the opening with the closure means;

whereby the metal foil acts as a vapor barrier preventing corrosive vapor, water vapor or oxygen from reaching the metal article.

Preferably, the container is in the form of a bag and the closure means comprises two opposed strips of heat-sealable adhesive material extending along the edges of the bag adjacent the opening. For example, use can be made of the heat-sealable adhesive material sold under the trademark SURLYN by Du Pont. Step (c) is carried out with a conventional heat-seal equipment which applies heat and pressure to the edges of the bag to seal the edges air-tight.

BRIEF DESCRIPTION OF THE DRAWINGS

Further features and advantages of the invention will become more readily apparent from the following description of preferred embodiments illustrated by way of examples in the accompanying drawings, in which.

DESCRIPTION OF PREFERRED EMBODIMENTS

Figure 1:
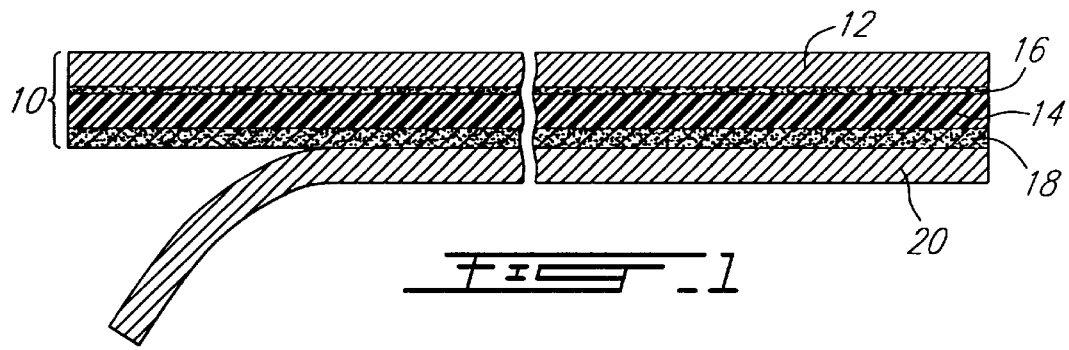
FIG. 1 is a fragmented sectional view of a metal-plastic laminate for protecting a metal surface against corrosion, in accordance with a preferred embodiment of the invention.

Referring first to FIG. 1, there is illustrated a metal-plastic laminate 10 comprising an aluminum or copper foil 12 having a thickness of about 10 to 100$\mu$, a nylon film 14 having a thickness of about 10 to 100$\mu$ and a layer of acrylic adhesive 16 having a thickness of about 2 to 10$\mu$ and securely bonding the metal foil 12 and nylon film 14 together. The laminate 110 further includes a layer of pressure-sensitive acrylic adhesive 18 having a thickness of about 5 to 30 $\mu$m for adhesively bonding the laminate to a metal surface. The adhesive layer 18 is covered with a peel-off removable backing member 20 consisting of silicone coated polyethylene sheet having a thickness of about 15 to 50$\mu$. Preferably, the thicknesses of the metal foil 12, nylon film 14, adhesive layers 16,18 and backing sheet 20 are 25$\mu$, 25$\mu$, 5$\mu$, 15$\mu$ and 25$\mu$, respectively.

Figure 2:
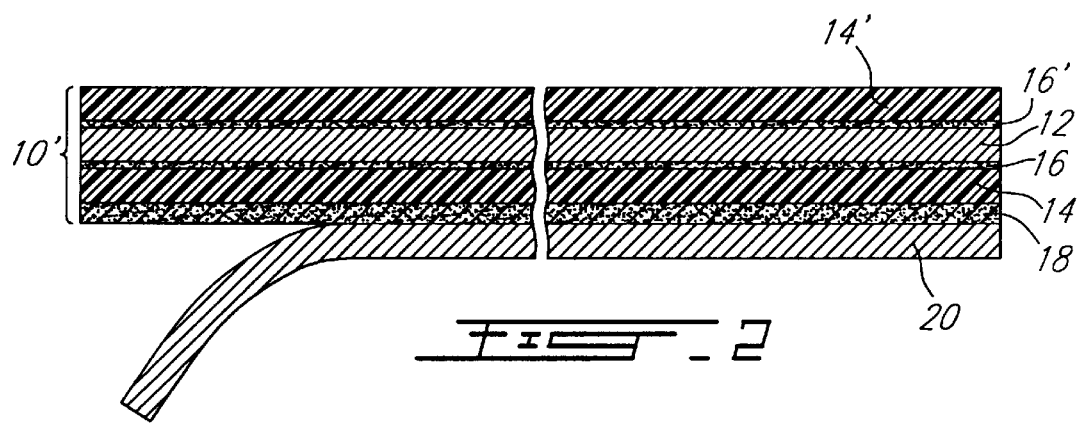
FIG. 2 is a fragmented sectional view of a metal-plastic laminate for protecting a metal surface against corrosion, in accordance with another preferred embodiment of the invention.

The metal-plastic laminate 10' illustrated in FIG. 2 is similar to the laminate 10 shown in FIG. 1, with the exception that the laminate 10' further includes an additional nylon film 14' having a thickness of about 10 to 100$\mu$ and an additional layer of acrylic adhesive 16' having a thickness of about 2 to 10$\mu$ and securely bonding the nylon film 14' to the metal foil 12. The additional nylon film 14' protects the metal foil 12 against abrasion and impact. Preferably, the thickness of the nylon film 14' and adhesive layer 16' are 25$\mu$ and 5$\mu$, respectively.

Figure 3:
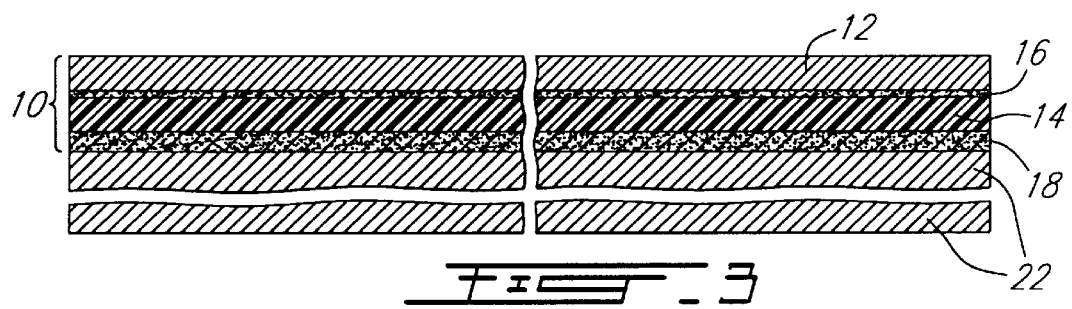
FIG. 3 is a fragmented sectional view of the laminate of FIG. 1, shown bonded to a metal surface.

Prior to applying the laminate 10 or 10' onto a metal surface, the backing sheet 20 is peeled off to expose the pressure-sensitive acrylic adhesive 18 for adhesion to the metal surface. The laminate 10 or 10' with the exposed adhesive 18 is then applied onto the metal surface with a firm hand pressure sufficient to cause adhesion. FIG. 3 illustrates the laminate 10 bonded to the surface of a metal substrate 22 by means of the adhesive 18. The metal foil 12 acts as a vapor barrier preventing corrosive vapor, water vapor or oxygen from reaching the metal 22. The nylon film 14, on the other hand, electrically insulates the metal foil 12 and metal substrate 22 from one another and thus prevents bimetallic corrosion. Where the laminate 10 is in the form of a strip, the strips are applied onto the surface of the metal substrate 22 in a manner such that successive strips overlap by about 3 to 5 mm.

Figure 4:
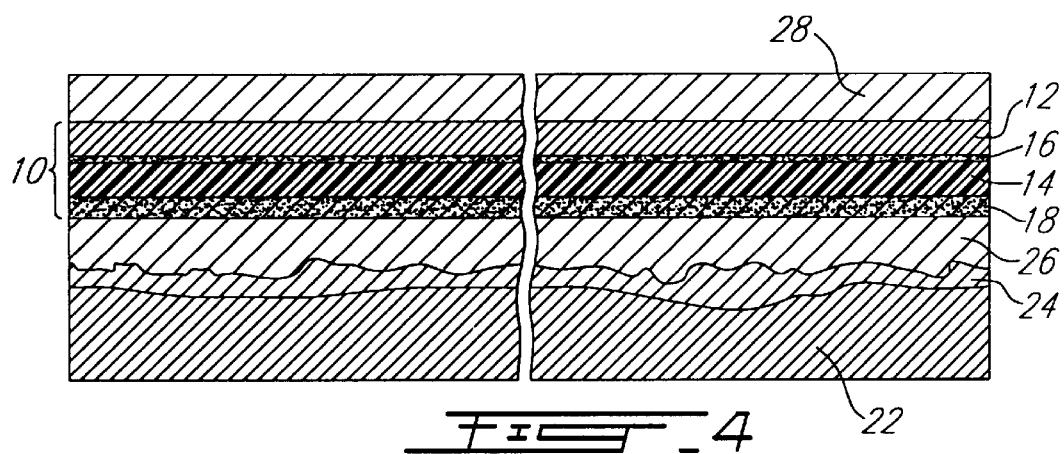
FIG. 4 is a fragmented sectional view of the laminate of FIG. 1, shown bonded to a rusted metal surface coated with an epoxy primer, the laminate being provided with a polyurethane acrylic topcoat.

When the metal substrate 22 is rusted, the substrate is cleaned to ISO standard 8501 St 2 where loose rust is removed but tightly adhering mill scale, old paint and rust remains on the substrate. An epoxy primer fluid is then applied onto the cleaned substrate by brush, roller or spray and allowed to solidify to at least a touch dry condition. The laminate 10 or 10' is then applied onto the primed substrate as indicated above. FIG. 4 illustrates the laminate 10 bonded to such a primed metal substrate 22 having a layer of rust 24 with a coating of epoxy primer 26 thereon. The thickness of the epoxy coating 26 ranges from about 25 to about 50$\mu$. After application of the laminate 10, a polyurethane acrylic topcoat 28 is applied onto the metal foil 12. The topcoat 28 has a thickness of about 25 to about 50$\mu$.

Figure 5:
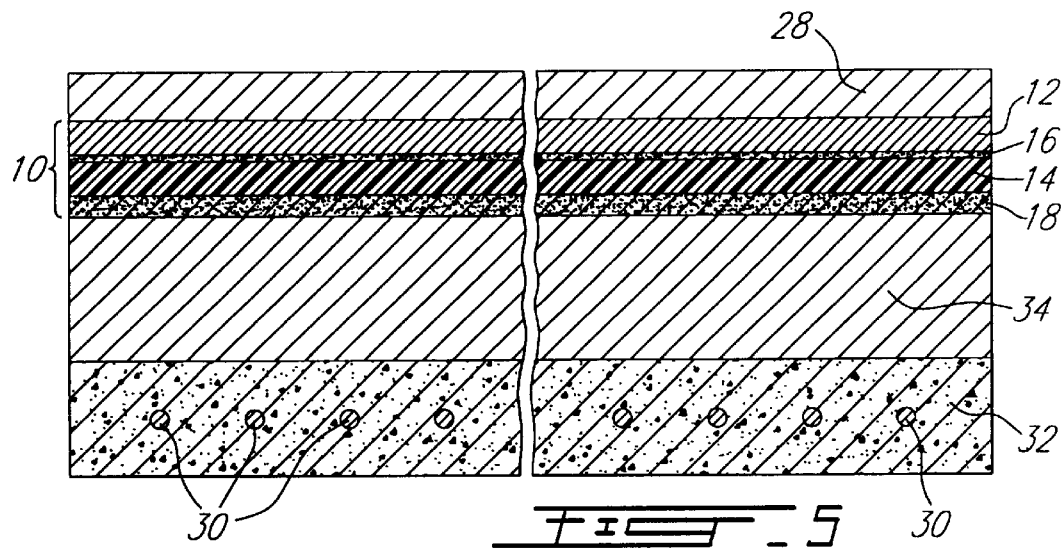
FIG. 5 is a fragmented sectional view of the laminate of FIG. 1, shown bonded to an epoxy-coated metal-reinforced concrete, the laminate being provided with a polyurethane acrylic topcoat.

The laminate 10 or 10' can also be used to prevent corrosion of metal reinforcing bars 30 in reinforced concrete 32, as shown in FIG. 5. The surface of the concrete is first coated with an epoxy fluid to seal and level the concrete surface, and the coating of epoxy fluid is allowed to solidify to at least a touch dry condition. The laminate 10 or 10' is then applied onto the coated concrete surface as indicated above. FIG. 5 illustrates the laminate 10 bonded to such a concrete having an epoxy coating 34 thereon. The thickness of the epoxy coating 34 ranges from about 100 to about 300$\mu$. After application of the laminate 10, an acrylic topcoat 28 is applied onto the metal foil 12. It is also possible to apply an alkyd, epoxy or vinyl topcoat onto the metal foil 28, instead of an acrylic topcoat. Since the nylon film 14 and concrete 32 are permeable to corrosive vapor, water vapor and oxygen, the metal foil 12 which acts as a vapor barrier prevents such vapors from reaching the metal bars 30.

Figure 6:
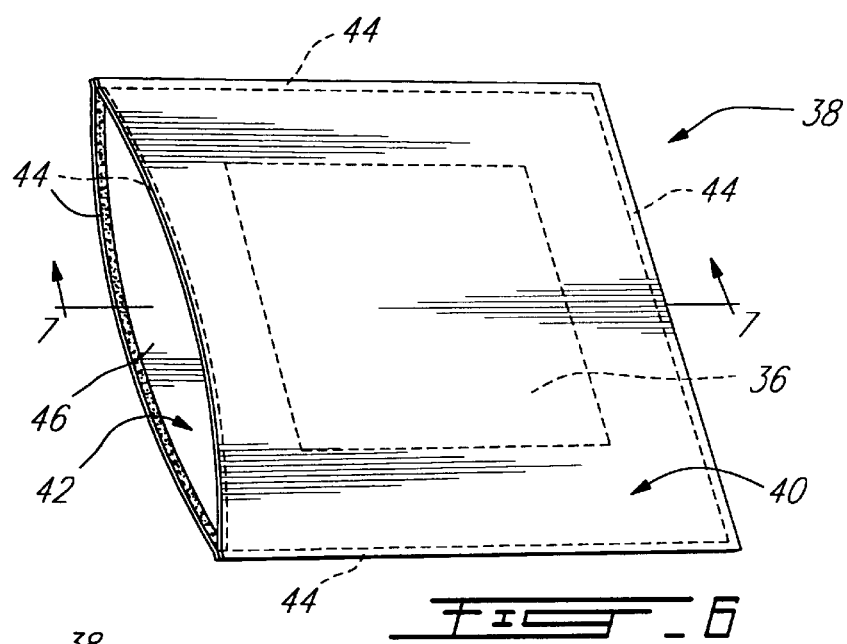
FIG. 6 is a perspective view of a bag for protecting a metal article against corrosion, in accordance with a preferred embodiment of the invention.
Figure 7:
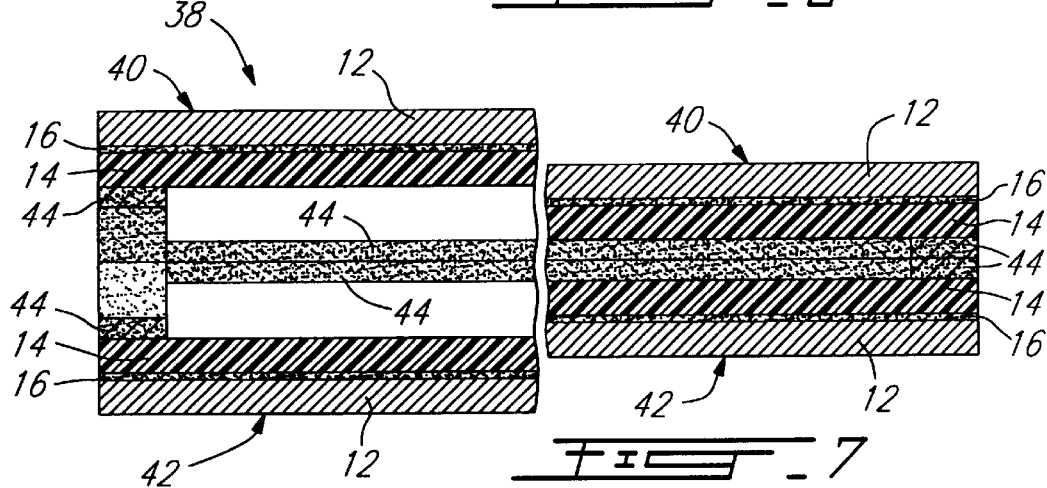
FIG. 7 is a fragmented sectional view taken along line 7—7 of FIG. 6.

FIGS. 6 and 7 illustrate how a metal article 36 can be protected against corrosion by using a bag 38 of square configuration having walls 40 and 42 made of a metal-plastic laminate comprising the aforesaid metal foil 12, nylon film 14 and adhesive layer 14, the metal foil 12 and nylon film 14 defining outer and inner layers, respectively, of the laminate. The nylon film 14 of each wall is provided with a strip of heat-sealable adhesive material 44 extending along the edges of the walls 40 and 42. The edges of three of the four sides are heat-sealed to provide an opening 46 for insertion of the metal article 36. After the article 36 has been inserted into the bag 38 through the opening 46, the opening 46 is closed by means of a conventional heat-seal equipment which applies heat and pressure to the edges of the walls 40,42 adjacent the opening 46 to seal the edges air-tight.

The metal foil 12 of each wall 40,42 prevents corrosive vapor, water vapor or oxygen from reaching the metal article 36 inside the bag 38. The nylon films 14, on the other hand, electrically insulate the metal foils 12 and the metal article 36 from one another and thus prevent bimetallic corrosion. Although not illustrated, an additional nylon film such as the film 14' shown in FIG. 2 can be adhesively bonded to the metal foil 12 of each wall 40,42 in order to protect the metal foils 12 against abrasion and impact.

We claim:

1. A method of preventing corrosion of metal reinforcing bars in reinforced concrete, which comprises adhesively bonding a flexible, vapor impermeable metal-plastic laminate to the surface of said concrete, said laminate comprising a metal foil and a plastic film having one surface bonded to one surface of said metal foil, said metal foil being remote from said concrete surface with said plastic film disposed therebetween, and acting as a vapor barrier preventing corrosive vapor, water vapor or oxygen from reaching said metal bars, said plastic film protecting said metal foil from being damaged by said concrete surface.

2. A method as claimed in claim 1, wherein prior to applying said laminate onto said concrete surface, said surface is coated with a resinous primer fluid to seal and level said concrete surface.

3. A method as claimed in claim 1, wherein said laminate further includes a layer of pressure-sensitive adhesive material on the opposite surface of said plastic film for bonding said laminate to said concrete surface, said layer of pressure-sensitive adhesive material being covered with a peel-off removable backing member, and wherein said backing member is peeled off prior to exposing said pressure-sensitive adhesive material for adhesion to said concrete surface.

4. A method as claimed in claim 1, wherein after applying said laminate onto said concrete surface, said metal foil is coated with a resinous fluid and the coating of resinous fluid is allowed to solidify.

5. A method as claimed in claim 4, wherein said resinous fluid is an acrylic, alkyd, epoxy or vinyl fluid.

6. A method of protecting a metal surface against corrosion, which comprises adhesively bonding a flexible, vapor impermeable metal-plastic laminate to said metal surface, said laminate comprising a metal foil and a plastic film having one surface bonded to one surface of said metal foil, said metal foil being remote from said metal surface with said plastic film disposed therebetween, and acting as a vapor barrier preventing corrosive vapor, water vapor or oxygen from reaching said metal surface, said plastic film electrically insulating said metal foil from said metal surface and preventing bimetallic corrosion.

7. A method as claimed in claim 6, wherein said laminate further includes a layer of adhesive material disposed between said metal foil and said plastic film and securely bonding said metal foil and said plastic film together.

8. A method as claimed in claim 7, wherein said plastic film is a nylon film and said metal foil is an aluminum or copper foil.

9. A method as claimed in claim 8, wherein said adhesive material comprises an acrylic adhesive.

10. A method as claimed in claim 6, wherein said laminate further includes a layer of pressure-sensitive adhesive material on the opposite surface of said plastic film for bonding said laminate to said metal surface, said layer of pressure-sensitive adhesive material being covered with a peel-off removable backing member, and wherein said backing member is peeled off prior to applying said laminate onto said metal surface, to expose said pressure-sensitive adhesive material for adhesion to said metal surface.

11. A method as claimed in claim 10, wherein said plastic film is a nylon film.

12. A method as claimed in claim 11, wherein said pressure-sensitive adhesive material comprises an acrylic adhesive.

13. A method as claimed in claim 6, wherein prior to applying said laminate onto said metal surface, said metal surface is cleaned, the cleaned metal surface is coated with a resinous primer fluid and the coating of resinous primer fluid is allowed to solidify to as least a touch dry condition.

14. A method as claimed in claim 13, wherein said metal surface is cleaned substantially to standard ISO 8501-1 St 2.

15. A method as claimed in claim 13, wherein said resinous primer fluid is an acrylic, alkyd or epoxy metal primer.

16. A method as claimed in claim 10, wherein after said laminate has been applied onto said metal surface, said metal foil is coated with a resinous fluid and the coating of resinous fluid is allowed to solidify.

17. A method as claimed in claim 16, wherein said resinous fluid is a polyurethane, polyurethane-acrylic or acrylic fluid.

18. A method as claimed in claim 6, wherein said metal surface has a crevice formed therein and wherein said laminate covers and seals said crevice.

19. A method as claimed in claim 18, wherein said crevice is filled with a solid filler material prior to applying said laminate onto said metal surface.

* * * * *